US008639704B2

(12) United States Patent
Yerli

(10) Patent No.: US 8,639,704 B2
(45) Date of Patent: Jan. 28, 2014

(54) INHERITED USER RATING

(75) Inventor: Cevat Yerli, Frankfurt am Main (DE)

(73) Assignee: Gface GmbH, Frankfurt/Main (DE)

(*) Notice: Subject to any disclaimer, the term of this patent is extended or adjusted under 35 U.S.C. 154(b) by 0 days.

(21) Appl. No.: 13/439,771

(22) Filed: Apr. 4, 2012

(65) Prior Publication Data

US 2013/0268539 A1    Oct. 10, 2013

(51) Int. Cl.
*G06F 17/30* (2006.01)
(52) U.S. Cl.
USPC .......................................................... 707/748
(58) Field of Classification Search
USPC ......................................... 707/748, 723, 735
See application file for complete search history.

(56) References Cited

U.S. PATENT DOCUMENTS

| 6,092,049 | A  | * | 7/2000  | Chislenko et al. ............ 705/7.29 |
|-----------|----|---|---------|-----------------------------------------|
| 7,574,422 | B2 | * | 8/2009  | Guan et al. ............................ 1/1 |
| 7,890,513 | B2 | * | 2/2011  | Plastina et al. ................. 707/748 |
| 8,301,623 | B2 | * | 10/2012 | Chakrabarti et al. .......... 707/723 |
| 2002/0198866 | A1 | * | 12/2002 | Kraft et al. ......................... 707/3 |
| 2005/0159970 | A1 | * | 7/2005  | Buyukkokten et al. ........... 705/1 |
| 2006/0242554 | A1 | * | 10/2006 | Gerace et al. ................ 715/501.1 |
| 2007/0011073 | A1 | * | 1/2007  | Gardner et al. ................. 705/35 |
| 2007/0198510 | A1 | * | 8/2007  | Ebanks ............................ 707/5 |
| 2007/0256093 | A1 | * | 11/2007 | Hiler ............................... 725/28 |
| 2009/0083126 | A1 | * | 3/2009  | Koren et al. ..................... 705/10 |
| 2009/0119258 | A1 | * | 5/2009  | Petty ................................ 707/3 |
| 2009/0144272 | A1 | * | 6/2009  | Adarsh et al. ..................... 707/5 |
| 2009/0234828 | A1 | * | 9/2009  | Tu ..................................... 707/5 |
| 2010/0030764 | A1 | * | 2/2010  | Koren ............................... 707/5 |
| 2010/0042577 | A1 | * | 2/2010  | Rinearson ....................... 706/56 |
| 2010/0088265 | A1 | * | 4/2010  | Pohl ................................ 706/46 |
| 2010/0174722 | A1 | * | 7/2010  | Carteri .......................... 707/748 |
| 2010/0257184 | A1 | * | 10/2010 | Uy ................................. 707/748 |
| 2011/0066954 | A1 |   | 3/2011  | Zuber |
| 2011/0252044 | A1 | * | 10/2011 | Shin .............................. 707/749 |
| 2011/0302104 | A1 | * | 12/2011 | Takushima .................... 705/347 |
| 2012/0144413 | A1 | * | 6/2012  | Wang et al. ..................... 725/13 |

OTHER PUBLICATIONS

Yerli, C., "Management of Online Content in a Network," U.S. Appl. No. 13/609,046, filed Sep. 10, 2012.
European Search Report dated Sep. 9, 2013, in European Patent Application No. 13 16 2141.9, filed Apr. 3, 2013, 5 pages.

* cited by examiner

*Primary Examiner* — Cam-Linh Nguyen
(74) *Attorney, Agent, or Firm* — Christensen O'Connor Johnson Kindness PLLC

(57) ABSTRACT

A method, a computer-readable medium, and an online system for determining ratings of users of the online system. The online system enables each user to directly assign rating scores to other users of the online system and to assign rating scores to content items created by other users. The method comprises retrieving a first score indicative of rating scores directly assigned to a user of the online system by other users of the online system; retrieving a second score indicative of rating scores assigned to content items by other users of the online system, wherein the content items are created by the user; and determining a rating of the user based on the first and second scores. Each content item created by the user represents one of an online content published by the user in the online system and an activity initiated by the user within the online system.

13 Claims, 1 Drawing Sheet

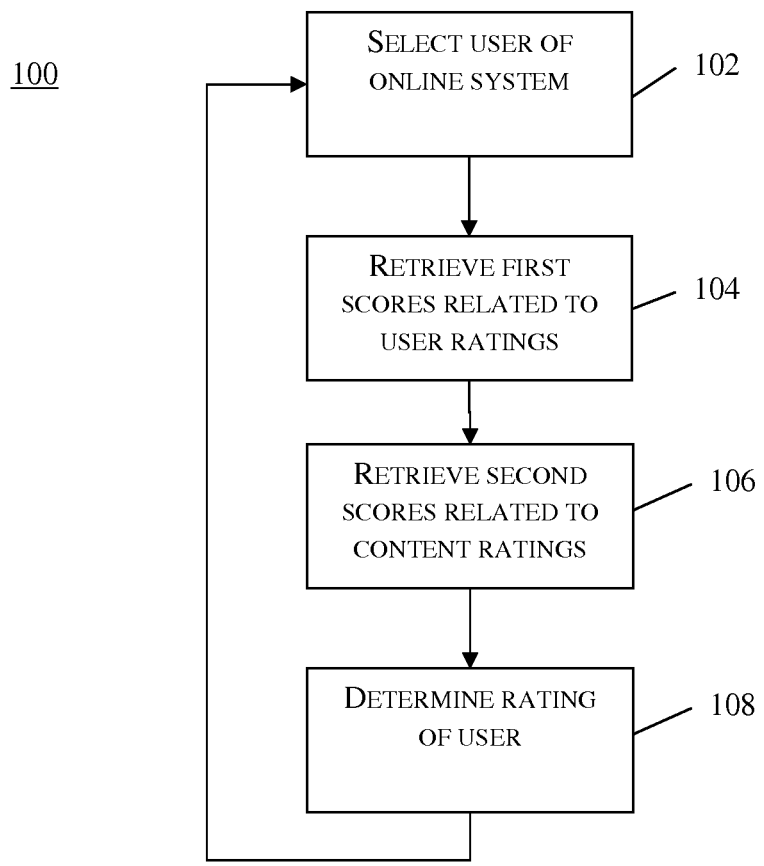

INHERITED USER RATING

TECHNICAL FIELD

The present disclosure relates to the rating of users of online systems. In particular, the present disclosure relates to a method for determining ratings of users of an online system and to an online system enabling users to assign rating scores to other users and content, wherein the scores are used to determine ratings of users of the online system.

BACKGROUND

In online systems, such as social networks, online platforms, communication and networking sites and other systems and interfaces, which may be accessible via a network by a plurality of users and enable users to initiate and participate in a plurality of actions, users are typically allowed to rate other users or content. The ratings are typically processed and the overall score is presented to other users which are currently accessing a profile of the respective user or the content. For example, social networks allow users to directly rate other users or online content by assigning a value to the rated user or content, which is indicative of an appreciation of the user or content. The social network typically determines an overall rating score by considering the respective values of the ratings or a number of appreciations. The higher the values or appreciations, the higher the final rating of the respective user or content of the online system. Often, a higher rating is more desirable since it is linked to a higher quality, such as a valuable online content or a favoured active user having a close network with other users.

However, current approaches to rating do not take into consideration a linking effect or dependency of the different ratings related to content and its creator, which may, for example, refer to a quality in terms of being rated high or low. Hence, the creator could be rated very high, but all of his online content could be rated extremely low, or vice versa, without any interdependency of the respective ratings as it would be expected in real life.

In view of the above, one object is to improve the overall rating for users of online systems.

SUMMARY

The problem is solved by the method for determining ratings of users of an online system, and the online system as defined in the independent claims. Furthermore, a computer-readable medium and a server hosting an online system are defined. Preferred embodiments are defined in the corresponding dependent claims.

A first aspect of the present disclosure provides a method for determining ratings of users of an online system, wherein the online system enables each user to directly assign rating scores to other users of the online system and further enables each user to assign rating scores to content items created by other users, wherein the method comprises the steps of retrieving a first score indicative of rating scores directly assigned to a user of the online system by other users of the online system, and retrieving a second score indicative of rating scores assigned to content items by other users of the online system, wherein the content items are created by the user. Furthermore, a rating of the user based on the first and second scores is determined. Each content item created by the user represents one of an online content published by the user in the online system and an activity initiated by the user within the online system.

The method, which preferably is a computer-implemented method, allows for a flexible rating of users in more than one category, being defined by the first and second scores, respectively, enabling a direct rating of the user himself by other users and using the rating of his content. All these respective rating scores are preferably combined and processed into one rating, which is also called overall rating or inherited user rating hereinafter.

For each user of the online system, the first score may be retrieved and composed of any rating scores, such as two or more rating scores, which have previously been directly assigned to the respective user by other users. The rating scores may, for example, reflect appreciation for that user. The second score for that user is retrieved and composed of any rating scores, which have previously been assigned to any content items within the online system, that have been created by the user. For example, the user may have uploaded the related content to the online system or initiated an activity within the online system. Hence, the content items which have been created or owned by the user may be, for example, connected or otherwise linked to the user in order to indicate the creator or owner of that content item. The online system may follow the respective connections or links and retrieve the rating scores associated with the respective content or action.

Each content item may be a container representing online content and metadata characterizing the online content. The online content may refer to general media content, such as audio and video files, and any other content represented by files or digital data objects which may be published on the online system. Furthermore, the container may represent any action hosted by the online system. For example, the content item may refer to a chat or a game session involving a plurality of users of the online system. The content item may be owned by the user who has initiated the action. In addition, the content item may be linked to all users participating in the respective action. A container or seed for representing online content and actions applicable in the method is, for example, described in the U.S. Provisional Patent Application No. 61/533,842, filed Sep. 13, 2011, the entire content of which is incorporated herein by reference. Thus, for example, users can rate any seed that is accessible to the user and the rating score related to the seed will influence the overall rating of the user who created the seed.

The rating scores can be defined and added by other users of the online system. Also, the online system may define rating scores automatically, based on certain rules that can be defined on a case-by-case procedure. For example, the online system may derive a rating score for a media content based on the number of views or clicks by other users. After each view of the media content, the rating score may increase, leading to an improved overall score of the creator or owner of the online content.

For each user of the online system, the rating method may be executed independently and concurrently. The method may, for example, be embodied as a light-weight thread or process. The execution of the method may, as well, be triggered by the online system as soon as new rating scores related to users or content items have been provided on the online system. The online system may, for example, track any links or connections originating from the rated content item and may trigger a determination of overall rating at each encountered user representation. Yet, it is to be understood that the determination of the overall rating may also be executed at pre-determined intervals or at a certain time, such as each 10 minutes or at Monday morning or at another time or day, where the overall load of the online system may be relatively low. However, it is to be understood that the disclosure is not restricted to a particular interval or time.

The rating may be represented in any suitable form. It can be, for example, an absolute number of ratings, a percentage of processed values, or may comprise a row of stars ranging between any suitable values, such as numerical values from 1 to 5.

The inventive method greatly improves the rating of users of online systems and reflects an overall appreciation of users which would be expected in real life. In particular, the method allows to reward users that supply content of high quality since they are rewarded with a high rating derived from the provided high quality content.

In a preferred embodiment, determining the rating includes weighting the first and second scores and combining the weighted first and second scores to determine the rating. In particular, the different sources of the ratings can be weighted in different ways in order to better represent the user behaviour within the online system. For example, an online system dedicated to online media content, may use a higher weight for the second score related to content items published on the online system. The weights may also be adapted or adjusted to achieve a desired behaviour of users. For example, if the weight related to content items is increased, the users may have an additional incentive to provide content of higher quality, which will presumably receive higher rating scores and thus will improve the overall rating of the creator. On the other hand, if the weight related to the direct user rating is increased, the users may be strongly motivated to get more involved with other users of the online system in order to increase the personal ratings.

According to a particularly preferred embodiment, determining the rating includes applying one or more rules. For example, one or more rules may further determine the type of the content item contributing a particular rating score and may apply additional weights.

In another preferred embodiment, the first score is a sum of all rating scores directly assigned to the user, and the second score is a sum of all rating scores assigned to the content items created by the user. Hence, the rating of a user may be a combination of at least two sums, wherein the first sum is a collection of rating scores directly assigned to the user. The second sum may represent a collection of rating scores given to all content items or seeds that are created by the user. Further, the second sum may be derived from a plurality of combinations of separate ratings of different content and/or activities. For example, rating scores for a certain type of media content may be accumulated and rating scores for certain activities may be accumulated. The resulting rating scores may be combined in the second sum, which may lead to the second score. Also, it is to be understood that the first and second scores may represent a single value, such as the first and second sums, or a vector of values, such as accumulated rating scores for certain types of content items.

In yet another preferred embodiment, each content item is associated with one or more other content items, and a rating of a content item is a combination of rating scores assigned to the content item by the other users and ratings of each of the one or more other content items associated with the content item. This enables a more flexible and adaptable computation of ratings which closely resembles ratings encountered in real life. For example, an online action initiated by a user, such as an online game, may be linked to additional items, which may have a certain value for the participants of the online game and which may be used in the online game. For example, the rating score of the online action may be automatically set by the online system based on the number of participants. The additional items may be provided by the participants and may be rated by other users. Hence, the rating of the user owning the online action will include both the rating score of the online action as well as the rating scores of the linked additional items.

According to a particularly preferred embodiment, the second score is a combination of all rating scores of online content published by the user and all rating scores of activities initiated by the user.

According to another aspect of the disclosure, a computer-readable medium is provided having instructions stored thereon, wherein said instructions, when installed and executed on a computing device, cause said computing device to automatically perform the method according to an embodiment of the present disclosure. In particular, the instructions may represent any processing step according to one or more of the above-indicated embodiments in any combination. The computing device may host an online system, wherein the online system enables each user to directly assign rating scores to other users of the online system and further enables each user to assign rating scores to content items created by other users. The computing device may either remotely or locally access the computer-readable medium and transfer the instructions to a memory, such that the online system will be configured to execute the method for determining ratings of users of the online system, wherein the method comprises the processing steps of retrieving a first score indicative of rating scores directly assigned to a user of the online system by other users of the online system; retrieving a second score indicative of rating scores assigned to content items by other users of the online system, wherein the content items are created by the user; and determining a rating of the user based on the first and second scores, wherein each content item created by the user represents one of an online content published by the user in the online system and an activity initiated by the user within the online system.

Furthermore, the online system according to the present disclosure enables each user of the online system to directly assign rating scores to other users of the online system and further enables each user to assign rating scores to content items created by other users. In particular, the online system comprises a data structure including, for each user, a first score indicative of rating scores directly assigned to the user of the online system by other users of the online system, and a second score indicative of rating scores assigned to content items by other users of the online system, wherein the content items are created by the user; and a processing unit configured to determine a rating of the user based on the first and second scores, wherein each content item created by the user represents one of an online content published by the user in the online system and an activity initiated by the user within the online system.

According to a particularly preferred embodiment, the processing unit is further configured to weight the first and second scores and to combine the weighted first and second scores to determine the rating.

According to another aspect, the system further comprises a rule-based system, wherein the processing unit is coupled to the rule-based system to apply one or more rules provided by the rule-based system in order to determine the rating.

In a particularly preferred embodiment, the online system is a social network.

Furthermore, according to the present disclosure a server is provided, wherein the server hosts an online system according to an embodiment of the present invention. In particular, the server may host an online system comprising the respective features of one or more embodiments in any combination.

DESCRIPTION OF THE DRAWINGS

The specific features, aspects and advantages of the present disclosure will be better understood with regard to the following description and accompanying drawings where:

FIG. 1 shows a method for determining ratings of users of an online system according to a preferred embodiment.

DETAILED DESCRIPTION

In the following description of preferred embodiments, reference is made to the drawing that shows by way of illustration a specific embodiment. It is to be understood that the embodiments may include changes in design and structure without departing from the scope of the present invention as defined in the claims.

FIG. 1 shows a method for determining ratings of users of an online system according to a preferred embodiment. The method 100 starts at block 102, wherein a user of the online system is selected. The online system may enable each user to directly assign rating scores to other users of the online system and further may enable each user to assign rating scores to content items created by other users. At block 104, a first score is retrieved indicative of first rating scores directly assigned to the user by at least some of the other users of the online system. For example, a second user of the online system may assign a high rating score to the user and a third user may assign a different, for example, lower rating score to the user. Both rating scores are combined and used to derive the first score.

At block 106, a second score is retrieved indicative of second rating scores assigned to content items or seeds created by the user, by other users of the online system. For example, at least one of the first and second users and/or a fourth and a fifth user may assign certain rating scores to a media content published by the user. Any rating scores related to the content may be combined and used to derive the respective second score. Each content item or seed created by the user may represent at least one of an online content published by the user in the online system and an activity initiated by the user within the online system.

The first and second scores may be computed as one or more sums or weighted sums of all respective first and second rating scores, such that at least one of the first and second scores may be represented as a single numerical value. Also, at least one of the first and second scores may be represented as a set of values, such as a vector, wherein each element of the respective vector may either represent the particular rating scores or partial sums or combinations of rating scores. For example, the second score may be a vector including a plurality of elements, wherein each element is related to a sum of rating scores related to a particular type of content item, such as one or more types of media files and actions. Similarly, the first score may be a vector including a plurality of elements, wherein each element is related to a particular category of users that have provided the rating scores, such as friends or other affiliations.

At block 108, a rating of the user is determined based on the first and second scores. The determination may include weighting of the first and second scores. Also, if the first and second scores are provided as vector values, individual weights may be assigned to the values in order to compute the overall rating of the user. The rating of the user may be a single value, such as a numerical value. However, the rating of the user may, as well, comprise several values in a plurality of categories and each of the values of the first and second scores may be differently weighted for each category.

After computation of the overall rating for the user selected in step 102, the method 100 may loop back to step 102 in order to enable selection of another user for which an overall rating is to be computed. However, it is to be understood that method 100 may, as well, be executed automatically and concurrently for a particular user only and, therefore, step 102 could be omitted after an initial selection of the user. In such a case, the method 100 could directly loop back to step 104, whenever new rating scores are available or whenever an update of the overall rating of the user is desired. Similarly, particular processing steps may be modified, added and omitted without leaving the scope of the present invention. Also, particular processing steps, such as steps 104 and 106, may be performed concurrently and/or in a different order from the examples described.

The method 100 according to embodiments of the present disclosure is applicable in a variety of use cases. For example, a user of a social network or another online system may have been rated by other users several times, such that the user has a first score or personal rating of 67%. This value may indicate that a certain amount of users directly rated the user in an overall positive way. Until now, the user may have uploaded a plurality of different media contents, such as 14 different videos, for example, containing different tutorials on how to repair certain parts of a personal computer. Many users may have watched these videos and found them very helpful and loaded with details on how to fix problems with personal computers. Hence, several of the users may have rated these videos in some affirmative way leading, for example, to a rating score of altogether 93% for the media content.

According to example embodiments, the overall rating, which may be displayed in combination with a profile of the user, may rely on a combination of these two ratings, which are combined by an algorithm, for example, defining weights and rules for combination of the respective rating scores, which may, for example, sum up to a rewarding 84% as the overall rating of the user. The algorithm, including the rules and weights, may be set by the provider of the social network and can be adapted to suit a fair balance between direct and inherited rating. Hence, although the user himself might not be very popular, his contributions to the social network in the form of helpful videos may raise his popularity.

According to another example, a user may be a celebrity known worldwide by many people and may have a user account in a social network. The user may have a higher personal rating compared to a normal user of the social network, although none of the media or other works, such as films that he or she is famous for are available in the social network directly. Nonetheless, his/her contributions to the network in form of public chat sessions and other activities can be rated by other users if they are linked to his/her user account. Thus, a combination of the personal rating scores with rating scores related to activities of the user on the social network will lead to a overall score for the user representative of his/her celebrity status.

In another example use case, a user may have 5 direct hits for his person indicative of the fact that other users like or appreciate the user, and 4 hits for content which has been uploaded by the user. Both rating scores may sum up to an overall rating of 9 hits (5+4). The calculation could also be weighted in any way to sum up the combined rating to the preferred ways of the social network.

While the preferred embodiments have been described in many details, it has to be understood that aspects of the invention can take many forms. In particular, the invention may be practiced within the scope of the claims differently from the examples described and the described features and characteristics may be of importance for the invention in any combination. The embodiments shown herein are intended to illustrate rather than to limit the invention as defined by the claims.

The embodiments of the invention in which an exclusive property or privilege is claimed are defined as follows:

1. A method for determining ratings of users of an online system, wherein the online system enables each user to directly assign rating scores to other users of the online system and further enables each user to assign rating scores to content items created by other users, the method comprising:

retrieving a first score indicative of rating scores directly assigned to a user of the online system by other users of the online system;

retrieving a second score indicative of rating scores assigned to content items by other users of the online system, wherein the content items are created by the user; and determining a rating of the user based on the first and second scores, wherein each content item created by the user represents one of an online content published by the user in the online system and an activity initiated by the user within the online system, and wherein the second score is a combination of all rating scores of online content published by the user and all rating scores of activities initiated by the user.

2. The method of claim 1, wherein determining the rating includes weighting the first and second scores and combining the weighted first and second scores to determine the rating.

3. The method of claim 1, wherein determining the rating includes applying one or more rules.

4. The method of claim 1, wherein the first score is a sum of all rating scores directly assigned to the user, and the second score is a sum of all rating scores assigned to the content items created by the user.

5. The method of claim 1, wherein each content item is associated with one or more other content items, and a rating of a content item is a combination of rating scores assigned to the content item by the other users and ratings of each of the one or more other content items associated with the content item.

6. A computer-readable medium having instructions stored thereon, wherein said instructions, when executed on a computing device, cause said computing device to automatically perform a method for determining ratings of users of an online system, wherein the online system enables each user to directly assign rating scores to other users of the online system and further enables each user to assign rating scores to content items created by other users, the method comprising:

retrieving a first score indicative of rating scores directly assigned to a user of the online system by other users of the online system;

retrieving a second score indicative of rating scores assigned to content items by other users of the online system, wherein the content items are created by the user; and determining a rating of the user based on the first and second scores, wherein each content item created by the user represents one of an online content published by the user in the online system and an activity initiated by the user within the online system, and wherein the second score is a combination of all rating scores of online content published by the user and all rating scores of activities initiated by the user.

7. An online system, enabling each user of the online system to directly assign rating scores to other users of the online system and further enabling each user to assign rating scores to content items created by other users, the online system comprising:

a data structure including for each user, a first score indicative of rating scores directly assigned to the user of the online system by other users of the online system, and a second score indicative of rating scores assigned to content items by other users of the online system, wherein the content items are created by the user; and a processing unit configured to determine a rating of the user based on the first and second scores, wherein each content item created by the user represents one of an online content published by the user in the online system and an activity initiated by the user within the online system, and wherein the second score is a combination of all rating scores of online content published by the user and all rating scores of activities initiated by the user.

8. The system of claim 7, wherein the processing unit is further configured to weight the first and second scores and to combine the weighted first and second scores to determine the rating.

9. The system of claim 7, further comprising a rule-based system, wherein the processing unit is coupled to the rule-based system to apply one or more rules provided by the rule-based system in order to determine the rating.

10. The system of claim 7, wherein the first score is a sum of all rating scores directly assigned to the user, and the second score is a sum of all rating scores assigned to the content items created by the user.

11. The system of claim 7, wherein each content item is associated with one or more other content items, and a rating of a content item is a combination of rating scores assigned to the content item by the other users and ratings of each of the one or more other content items associated with the content item.

12. The system of claim 7, wherein the online system is a social network.

13. The system of claim 7, wherein the online system is hosted on a server.

* * * * *